(No Model.)
O. B. BEACH.
BICYCLE BELL.
No. 504,902. Patented Sept. 12, 1893.
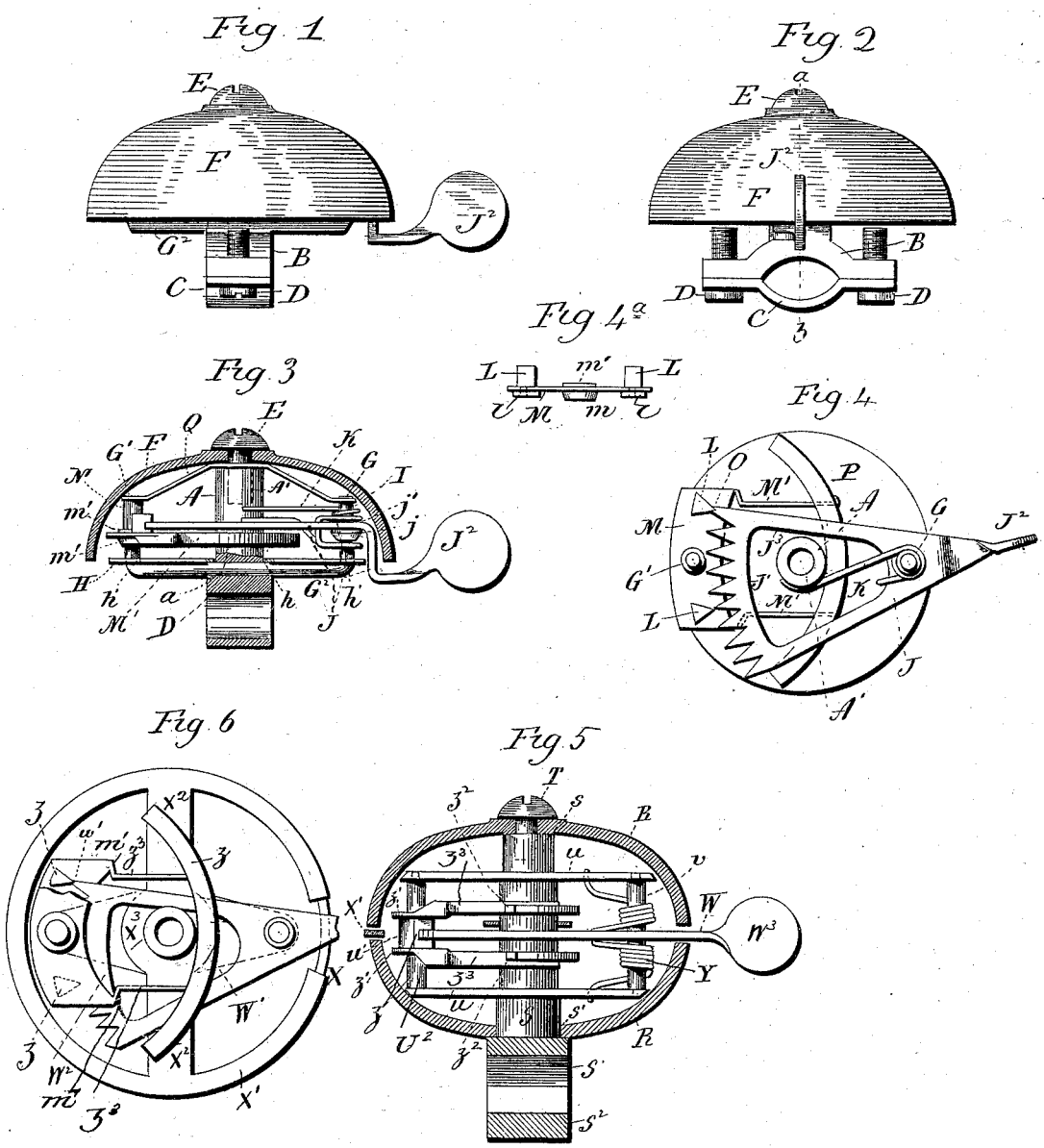

UNITED STATES PATENT OFFICE.

OLIVER B. BEACH, OF STONY CREEK, CONNECTICUT.

BICYCLE-BELL.

SPECIFICATION forming part of Letters Patent No. 504,902, dated September 12, 1893.

Application filed January 9, 1893. Serial No. 457,737. (No model.)

*To all whom it may concern:*

Be it known that I, OLIVER B. BEACH, of Stony Creek, in the county of New Haven and State of Connecticut, have invented new Improvements in Bicycle-Bells; and I do hereby declare the following, when taken in connection with accompanying drawings and the letters of reference marked thereon, to be a full, clear, and exact description of the same, and which said drawings constitute part of this specification, and represent, in—

Figure 1, a view in side elevation of one form which a bell constructed in accordance with my invention may assume; Fig. 2, a similar view thereof, showing the bell in position to give a full view of its clip; Fig. 3, a view of the bell in vertical central section on the line $a$—$b$ of Fig. 2; Fig. 4, a plan view of the bell with the bell proper removed; Fig. 4$^a$, a detached view in rear elevation of the verge; Fig. 5, a view in vertical section of a double bell constructed in accordance with my invention; Fig. 6, a plan view of the said double bell with one of its bells proper removed.

My invention relates to an improvement in bicycle-bells, the object being to produce a simple, conveniently operated, durable and reliable bell, giving a clear and penetrating alarm.

With these ends in view, my invention consists in a bicycle-bell having certain details of construction and combinations of parts as will be hereinafter described, and pointed out in the claims.

In constructing the single bell shown in Figs. 1 to 4$^a$ inclusive of the drawings, I employ a central post A, provided at its inner end with a yoke B, which forms the inner member of the clip by means of which the bell is secured to the handle-bar of the machine with which it is used, the other member of the clip consisting of the bowed strap C. The ends of the said yoke and strap are perforated to receive the clamping-screws D D. At its opposite or outer end the post is counter-bored and threaded, as at A′, to receive the screw E, by means of which the bell proper F, is secured to it.

As herein shown, the mechanism of the bell is attached to two parallel corresponding arms or bearings G G′, formed by the ends of a stiff wire rod G$^2$, the straight main-portion of which is passed through a transverse opening $a$, formed in the post, close to the inner face of the yoke, and at a right angle to the same, the said wire being fixed in position in the said opening, so that the said bearings G G′, will be held rigidly in positions parallel with the length of the post. A dish-shaped plate H, formed of thin sheet-metal and provided with a central perforation $h$, to fit over the post, and with perforations $h′$ $h′$, located opposite each other near its edges to fit over the bearings G G′, forms as it were a guard to close the open mouth of the bell, and keep dust out of the same, as well as protect the mechanism thereof. If desired the thin disk-shaped plate H, and the wire rod G$^2$, bent at its ends to form the bearings G G′, might obviously be replaced by a sheet-metal disk made heavy enough to have two pins corresponding to the bearings G G′ secured to it, by riveting, threading, or otherwise. A sleeve I, fitting snugly over the bearing G, is made a little shorter than the same, and carries the operating lever J, which is rigidly secured to the said sleeve by means of collars $j$ and $j′$ between which the said lever is interposed. The inner end of the lever is constructed to form a segmental rack J′, while its outer end is bent downward to clear the edge of the bell, and terminates in a finger-piece J$^2$, which is turned up at a right angle to its main portion. A wire spring K, coiled around the sleeve I, and having one end engaged with the lever, and its opposite end engaged with the post, is provided for operating the lever, which is centrally cut away, as at J$^3$ to clear the post. The teeth of the rack J′, engage with the triangular pins L L, of a verge, the body M, of which is formed as herein shown, as a piece of sheet-metal, and secured by collars $m$ $m$, between which it is interposed, to a sleeve N, mounted on the bearing G′, and corresponding to the sleeve I, before mentioned. The triangular pins L L, are secured to the said body M, of the verge, by means of nuts $l$ $l$. The segmental rack J′, is constructed at one end with a small notch O, for the adjacent verge-pin L to rest in when the bell is not in use, as shown by Fig. 4 of the drawings, whereby the verge is locked, so to speak, out of action. The edges of the body M, of the verge are bent downward at a right angle thereto, and extended inward to form parallel spring-arms M' M', which, as shown, extend past the post A, and carry the segmental hammer P, which is thus located on the opposite side of the post from the verge, with its concave edge facing the same. This hammer is adapted in length so that its respective ends stand adjacent or opposed to opposite points in the inner surface of the bell proper F which is struck at each end of its stroke, whereby a very clear and penetrating alarm is given when the bell is sounded.

A segmental bell-hammer constructed and arranged as described, has the effect in use of two bell hammers solidly connected together, for the recoil succeeding the striking of one end of the hammer against the bell is added to the force by which the other end of the hammer is thrown against the same, whereby the bell is given great power. The segmental form of the hammer well adapts it to the circular path in which it moves and is a compact construction. I do not, however, limit myself to forming the spring-arms M' M' integral with the body M, of the verge, nor to locating the bell-hammer on the opposite side of the post from the verge. By preference, however, the arms, whatever their construction may be, will be set inward near their outer ends, as at $m'$ $m'$, whereby they are assured of engagement with the opposite sides of the post when the mechanism is operated with the bell removed as it often will be in exhibiting the mechanism of the bell in the sale of the same. In such case the hammer, not being checked in endwise movement, would tend to fly past its ordinary stopping place, and wrench the arms, and perhaps whip them off, but this is avoided by providing for the engagement of the arms with the post under such circumstances, whereby the force of the unrestrained action of the hammer is broken. Or, the arms might be made straight and yet arranged to engage with the post as described for the purpose mentioned. By bending the arms, however, a greater length of spring is obtained, making them less liable to break.

As herein shown, I have provided for holding the sleeves I and N in place upon their bearings by means of a light sheet-metal plate Q, centrally perforated to receive the screw E, and having its ends perforated to fit over the ends of the said bearings. If preferred, however, the bearings may be headed down to hold the sleeves in place, and the said plate Q, dispensed with.

In Figs. 5 and 6 of the drawings, I have shown a double bell, in which the bells proper, R R, are secured to a post S, with their open ends in juxtaposition, the said post also carrying the striking mechanism, which is supported entirely independently of the said bells. The post S, is provided at its inner end with a yoke S', forming the inner member of a clip, of which the outer member $S^2$, will correspond to the strap C, of the bell shown in the preceding figures. The outer end of the post is counter-bored and threaded, as at $s$, to receive the screw T, which secures the outer bell in place, the inner bell being swaged, or otherwise secured to the base of the post, as indicated at $s'$. Two corresponding movement-plates U U, secured to the post on opposite sides of its center, form a frame-work for the striking mechanism, and have a small arbor U', and a verge staff $U^2$, mounted between their ends. The operating lever W, is rigidly secured to the arbor U', midway the length thereof, and thus pivotally connected with the said frame-work. The inner end of the said lever is cut away as at W', to clear the post S, and constructed to form the segmental rack $W^2$, while its outer end is shaped to form the finger-piece $W^3$, and extended outward through a radial slot X, formed in a ring X', corresponding to the diameter of the open edges of the bells, and located between the same, as shown by Fig. 6, and supported by a cross-piece $X^2$, which is centrally enlarged, as at $X^3$, and perforated for attachment to the post S, whereby the ring is supported between the bells without being in contact with either of them. The ring gives a finished appearance to the bells, and also excludes dust therefrom. A spiral spring Y, coiled upon the arbor U', engaged with the operating lever W, and having its ends engaged with the plates $u$ $u$, is employed to actuate the said lever. The segmental rack $W^2$, engages with the triangular pins $z$ $z$ of a verge, the body of which, as shown, is composed of two sheet-metal plates $z'$ $z'$, secured to the staff $U^2$ on opposite sides of the hub $u'$, made integral therewith, the verge being thus carried by the frame-work through the said arbor. The said hub is made larger in diameter than the staff, to afford a wide bearing for the said plates, and has its inner face concaved to clear the rack, as shown by Fig. 6 of the drawings. The ends of the plates $z'$ and $z'$, are bent at a right angle to them, and extended inward to form parallel spring-arms $z^3$, $z^3$, which pass beyond the post S on opposite sides of the same, and carry the segmental hammers $z^2$ $z^2$ which have their concaved faces presented to the said post. The said hammers $z^2$ $z^2$ are thus located on opposite sides of the operating lever W, and on opposite sides of the cross-piece $X^2$, and they are arranged to impinge upon the respective bells R R. A double verge and two hammers operated by means of one lever, might be employed in connection with a construction having only one bell, which in that case would be struck by both hammers. It will be noticed that the tooth at one end of the rack $W^2$ is notched at $w'$ in the same manner as the rack shown in Fig. 4 is notched at O'.

By my improved construction, I secure a bell which is very responsive and powerful in its action, compact in form, and durable and reliable in use.

It is apparent that in carrying out my invention I may resort to some changes from the specific construction shown and described, and I would therefore have it understood that I do not limit myself to the exact form and arrangement of parts shown, but hold myself at liberty to make such variations as fairly fall within the spirit and scope of my invention.

I am aware that a bicycle-bell having a segmental rack located at the inner end of a spring-actuated operating lever and co-acting with a verge to which a bell-hammer is yieldingly attached, is old, and I do not therefore claim that construction broadly.

Having fully described my invention, what I claim as new, and desire to secure by Letters Patent, is—

1. In a bicycle-bell, the combination with the bell proper, of a segmental rack, a verge, two spring arms extending inward from the said verge, and a rigid segmental hammer carried by the inner ends of the said arms, and adapted in length to have its respective ends stand adjacent to different points in the inner surface of the bell, substantially as described.

2. In a bicycle-bell, the combination with the bell proper, of a central post for supporting the same, a spring-actuated operating-lever constructed at its inner end with a segmental rack, a verge having pins with which the said rack engages, and having its body constructed of a piece of sheet-metal, the ends of which are bent at a right angle to it, and extended inward, and a segmental hammer connected with the inner ends of the said spring-arms, substantially as described.

3. In a double bicycle-bell, the combination with a central post, of two bells secured thereto, with their open edges near together, a frame-work connected with the said post independent of the said bells, a spring-actuated operating-lever pivotally connected with the said frame-work, and constructed at its inner end with a segmental rack, and at its outer end with a finger-piece which projects between and beyond the bells, a verge also carried by the said frame-work, having verge-pins engaged with the said rack, and two plates or members located on opposite sides of the said rack, and carrying the said pins; spring-arms extending inward from the said plates on opposite sides of the said lever and post, and segmental hammers also located on opposite sides of the said lever for engagement with the respective bells, and connected with the said arms of the verge-plates or members, substantially as described.

4. In a double bicycle-bell, the combination with a central post, of two bells secured thereto with their edges adjacent to each other, a frame-work connected with the post independent of the bells, and located within the same, a ring mounted upon the post about midway the length of the same, located in a plane at a right angle to the axis thereof and extending between the edges of the bells, a spring-actuated operating-lever hung on the said frame-work and constructed with a segmental rack, and with a finger-piece which extends outward through the said ring, a verge mounted in the said frame-work on the opposite side thereof from the suspension point of the lever, two pairs of spring arms extending inward from the said verge, on opposite sides of the said ring respectively, and two rigid segmental hammers respectively attached to the inner ends of the arms of the said pairs of arms, and adapted in length to have their respective ends stand adjacent to different points in the inner surface of the respective bells, substantially as described.

In testimony whereof I have signed this specification in the presence of two subscribing witnesses.

OLIVER B. BEACH.

Witnesses:
FRED C. EARLE,
LILLIAN D. KELSEY.